United States Patent Office 2,814,207
Patented Nov. 26, 1957

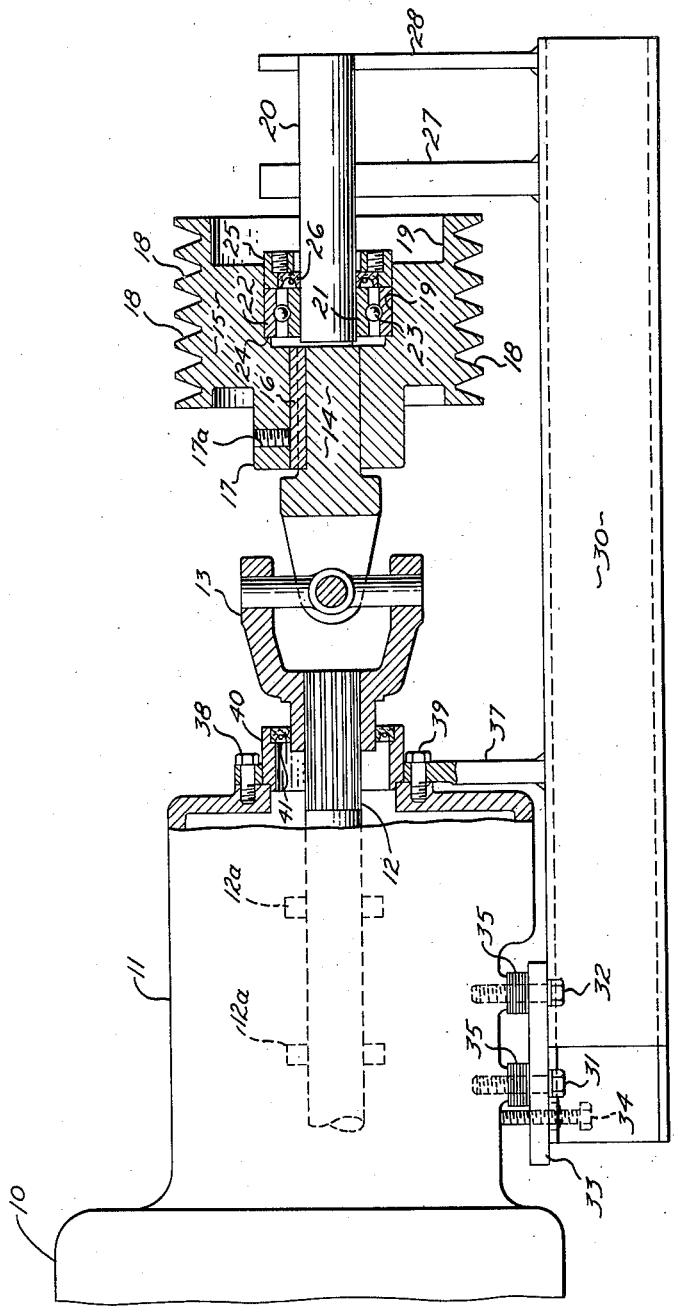
INVENTOR.
Stuart M. Weaver
BY
Hyde, Meyer, Baldwin & Doran
Attorneys

2,814,207

OUTBOARD BEARING

Stuart M. Weaver, Mansfield, Ohio, assignor to Loomis Machine Co., Tiffin, Ohio, a corporation of Ohio Application April 11, 1956, Serial No. 577,483

5 Claims. (Cl. 74—216.5)

This invention relates to outboard bearing supports and more particularly to bearing supports used in connection with multiple V-belt pulleys used in well drilling machines.

An object of the present invention is to provide a novel outboard bearing support for a multiple V-belt pulley, provided at the rear end of the transmission of a drilling machine, which is designed to remove all lateral forces exerted upon the gears and bearings of the transmission due to belt pull upon the pulley.

Another object of the present invention is to provide a drive unit wherein all lateral loads are removed from the gears and bearings of the transmission and pass directly from a belt-driven pulley directly to anti-friction means which are retained on a fixed support.

A further object of the present invention is to provide such a driving unit wherein the belt pull loads upon a multiple V-belt pulley are not transferred to the driving gears and bearings within the transmission but are rather directed to a self-aligning bearing centered within the belted area of the pulley and thence to a rigid bracket supporting said bearing independent of said transmission.

Still another object of the present invention is to provide improved means for mounting a multiple belt pulley on a bearing support which is rigidly connected to the associated transmission and at all times moves therewith to maintain alignment with the drive shaft of said transmission.

Another object of the present invention is to provide an outboard bearing support for a drive unit characterized by its structural simplicity, the ease of assembly of its parts, its strong and sturdy nature and its low manufacturing cost. Other features of this invention reside in the arrangement and design of the parts for carrying out their appropriate functions.

Further objects of the present invention and certain practical advantages will be referred to in or will be evident from the following description of one embodiment of the invention, as illustrated in the accompanying drawings in which The figure is a central vertical sectional view of the outboard bearing support unit embodying the present invention and shown as applied to a suitable motor and transmission.

Before describing in detail the herein disclosed embodiment of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

In the operation of drilling machines it becomes desirable to have means for varying the ratio between the engine speed and the speed of the drilling machine mechanism; it is also desirable to have means for reversing the drive between the engine and the drilling machine mechanism. At the present time the most economical means for achieving these two results is through the use of a standard truck transmission in association with the driving engine. Previously, a belt pulley was attached to the output shaft at the rear end of the transmission. This type of construction has one main disadvantage, namely, the lateral belt pull associated with the pulley subjects the gears and bearings of the transmission to a lateral force which results in undue wear and early bearing failures. In the past, efforts have been made to build an extended transmission shaft to mount the belt pulley immediately at the rear of the transmission. Normally this shaft was supported by two bearings inside of the transmission. With this construction, it was always necessary for the outboard bearing (that bearing located exteriorly of the transmission and supporting the belt pulley) to be perfectly aligned with the two interior bearings so as not to cause deflections in the various structures and thereby impart a heavy load to the interior bearings of the transmission. This type of structure has been subject to all the ills accompanying such close initial settings and the maintenance of such close tolerances. The present invention is directed to the elimination of all problems related to misalignment and undue bearing and gear wear in the transmission. Referring now to the drawing, the invention is embodied in a driving unit adapted for driving well drilling machine mechanisms, as heretofore discussed. The present driving unit includes a motor 10 which is only partially shown and a transmission 11 which is operatively connected to the motor 10. A splined shaft 12 extends outwardly from the rear of the transmission and is driven by the motor 10 through the transmission 11. Spaced bearings 12a supporting shaft 12 are diagrammatically shown to illustrate my new principle. A universal joint 13 is connected to the splined shaft 12 and is provided with a short integral shaft 14 which extends to the rear and is provided with a suitable slot for the purpose of attaching a multiple V-belt pulley 15 by a key. The V-belt pulley has an offset hub 17 which is press fitted and keyed at 16 to the shaft 14. A set screw 17a engages the key 16 to retain the parts in desired position. The pulley is provided with a plurality of annular V-shaped grooves 18 which extend circumferentially about the outer surface of the pulley and are adapted to receive and drive a plurality of suitable V-belts not herein shown. It will be noted that the short shaft 14 terminates some distance short of the longitudinal center of the belt engaging portion of the pulley or that portion of the pulley provided with the annular V-shaped grooves 18. For this reason, the hub 17 is extended somewhat beyond one end of that portion of the pulley containing grooves 18. The rub 17 permits a more secure engagement between the pulley and short shaft 14. The other end of the pulley is provided with a recessed or stepped axially extending bore 19 which is machined to cylindrical form within the pulley.

A fixed rigid cylindrical shaft 20 projects into the bore 19 of the pulley in substantial alignment with short shaft 14 and splined shaft 12. The rigid shaft 20 extends inwardly of the pulley a distance somewhat beyond the center of the belt engaging portion of the pulley and terminates just short of the innermost end of shaft 14. A ball bearing is retained on the rigid shaft 20 in such a manner that its inner bearing race 21 is snugly received on the shaft 20 while its outer bearing race 22 snugly engages the inner surface of pulley 15. The bearing is of conventional form and has a plurality of balls 23 arranged between the inner and outer races 21 and 22 respectively. The pulley 15 is mounted on the bearing to rotate thereon. The ball bearing is positioned centrally between the ends of the belt engaging portion of the pulley. This particular location of the ball bearing is found when the inner
} edge of the ball bearing is in engagement with the annular shoulder 24 provided in the bore 19 of the pulley. The outer race 22 is thus interposed endwise between the annular abutment shoulder 24 formed in the bore 19 of the pulley and an annular sealing ring 25 which mtaintains a grease impregnated seal 26 in contact with the roller bearing.

The rigid shaft 20 is integrally or rigidly connected to a pair of spaced outstanding brackets 27 and 28 which are in turn rigidly secured to a channel support member 30 which is rigidly mounted to the bottom of transmission 11 by means of cap screws 31 and 32. A spacer plate 33 is secured by bolt 34 on the top flange of the channel support member 30 and a plurality of washers 35 are provided between plate 33 and transmission 11 to permit adjustment of member 30 with respect to the motor and transmission. It will be understood that member 30 could also be connected to the motor 10. An upstanding arm 37 is rigidly secured to member 30 and is fastened to the rear end of transmission 11 by means of cap screws 38 and 39. The upstanding arm 37 has an aperture which extends therethrough and encircles and provides support for an outstanding cylindrical retaining ring 40 which contains an annular grease retaining seal 41 at the outer end of the transmission.

It results from this construction, that the engine and transmission may be shifted on supporting frames (not herein shown) to tighten the belts riding in grooves 18, or for any other purpose, and the channel support member 30, outstanding brackets 27, 28, 29 and rigid shaft 20 will move in unison therewith so that the parts maintain their aligned positions at all times. Any slight misalignment which occurs between the ball bearing 21, 22 within the pulley and the spaced bearings 12a within the transmission, on splined shaft 12, will be taken care of by the universal joint 13.

It will be further understood that any lateral forces transmitted to the pulley due to belt pull will be directed to rigid shaft 20, brackets 27 and 28 and channel support member 30 via the ball bearing in pulley 15. Thus, it will be seen that no lateral force is transmitted to the bearings and gears of the transmission, since the pulley in no way relies upon the transmission or its associated universal joint for support. The present construction has been found to remove all of the destructive lateral belt-induced forces from the internal bearings and gears of the transmission.

In view of the foregoing description, taken in conjunction with the accompanying drawings, it is believed that a clear understanding of the construction, operation, and advantages of the device will be quite apparent to those skilled in this art.

Having thus described my invention and illustrated its use, what I claim is new and desire to secure by Letters Patent is:

1. A driving unit comprising a motor and a transmission operatively connected to said motor, a shaft projecting from the end of said transmission, a universal joint secured on the end of said shaft, a pulley supporting shaft extending from said universal joint, a pulley drivingly secured at one end to said pulley supporting shaft, said pulley having a bore extending axially into the other end thereof, a fixed shaft extending into said other end of said pulley, an inner bearing race on said fixed shaft, an outer bearing race snugly contained in the bore of said pulley, anti-friction bearing elements accommodated between said races, said races and bearing elements being located substantially centrally of said pulley, sealing means removably holding said races and bearing elements within said pulley, support means rigidly secured to said unit, an upstanding bracket rigidly secured to said support means, said bracket supporting said fixed shaft in axial alignment with said pulley supporting shaft, whereby said races and bearing elements centered within said pulley transfer all lateral forces exerted upon said pulley to said bracket.

2. A driving unit comprising a motor, a transmission operatively connected to said motor, a spline shaft projecting from the end of said transmission, a universal joint secured on the end of said spline shaft, a pulley supporting shaft extending from said universal joint, a hollow pulley keyed at one end to said pulley supporting shaft, a fixed shaft extending into the other end of said pulley, an anti-friction bearing removably held on said fixed shaft, said bearing engaging the inner surface of said pulley, said bearing being located substantially centrally of said pulley, and means supporting said fixed shaft whereby said bearing centered within said pulley transfers all forces exerted upon said pulley to said support means.

3. A driving unit comprising a motor, a transmission operatively connected to said motor, means connecting to one end of said transmission a hollow pulley having the hollow portion thereof opening axially away from said connecting means, a fixed shaft extending into the hollow of said pulley, an anti-friction bearing on said fixed shaft, said bearing engaging the inner surface of said pulley, said bearing being located substantially centrally only of said pulley, and means supporting said fixed shaft independently of said transmission whereby said bearing centered within said pulley transfers all forces exerted upon said pulley to said supporting means.

4. A driving unit comprising a motor, a transmission operatively connected to said motor, a spline shaft projecting from the end of said transmission, a universal joint secured to the end of said spline shaft, a short pulley supporting shaft extending from said universal joint, a hollow pulley keyed at one end to said short shaft, a fixed shaft extending into the other end of said pulley, an inner bearing race removably held on said fixed shaft, an outer bearing race contained in the hollow of and supporting said pulley, anti-friction bearing elements accommodated between said races, said races and bearing elements being located substantially centrally of said pulley, sealing means removably holding said races and bearing elements within said pulley, a support channel rigidly secured to said transmission, and an upstanding bracket rigidly secured to the outer end of said support channel, said bracket supporting said fixed shaft in axial alignment with said short pulley supporting shaft, whereby said races and bearing elements centered within said pulley transfer all lateral forces exerted upon said pulley to said bracket.

5. A pulley driving unit comprising a motor, a transmission operatively connected with said motor, a pulley having one end operatively connected to said transmission, a universal joint operatively connected between said pulley connection and said transmission, said pulley having a bore extending axially into the other end thereof, rigid support means extending into the bore of said pulley, an anti-friction bearing retained on said rigid support means and engaging the inner walls of said pulley, said anti-friction bearing centered with respect to the belt engaging surface of said pulley, and sealing means retaining said anti-friction bearing in said centered position, said support means including a rigid member secured to the outer housing of said transmission, said anti-friction bearing being self-aligning whereby all belt induced forces upon said pulley are transferred to said bracket rather than to the gears and bearings of the transmission of said driving unit.

References Cited in the file of this patent
UNITED STATES PATENTS

| | | |
|---|---|---|
| 1,886,537 | Evans et al. | Nov. 8, 1932 |
| 2,082,260 | Reid | June 1, 1937 |
| 2,667,048 | Whitfield | Jan. 26, 1954 |